United States Patent
Schmitt

(10) Patent No.: US 8,121,623 B2
(45) Date of Patent: Feb. 21, 2012

(54) METHOD FOR REDUCING THE DELAY TIME BY A PAGING PROCEDURE IN NETWORK-INITIATED DATA TRANSMISSION IN GPRS-MOBILE COMMUNICATION NETWORKS

(75) Inventor: Harald Schmitt, Bendorf (DE)

(73) Assignee: T-Mobile International AG, Bonn (DE)

( * ) Notice: Subject to any disclaimer, the term of this patent is extended or adjusted under 35 U.S.C. 154(b) by 365 days.

(21) Appl. No.: 12/299,198

(22) PCT Filed: May 3, 2007

(86) PCT No.: PCT/EP2007/003895
§ 371 (c)(1),
(2), (4) Date: Apr. 9, 2009

(87) PCT Pub. No.: WO2007/128486
PCT Pub. Date: Nov. 15, 2007

(65) Prior Publication Data
US 2009/0197592 A1    Aug. 6, 2009

(30) Foreign Application Priority Data
May 5, 2006   (DE) .......................... 10 2006 021 342

(51) Int. Cl.
*H04W 68/00*    (2009.01)
(52) U.S. Cl. ...... 455/458; 455/515; 455/561; 455/456.1
(58) Field of Classification Search ................. 455/458, 455/515, 561, 456.1
See application file for complete search history.

(56) References Cited

U.S. PATENT DOCUMENTS

| | | |
|---|---|---|
| 6,243,579 B1 | 6/2001 | Kari |
| 6,434,396 B1 * | 8/2002 | Rune ............................. 455/502 |
| 6,584,314 B1 | 6/2003 | Haumont et al. |
| 6,600,731 B2 | 7/2003 | Menzel et al. |
| 7,346,031 B2 | 3/2008 | Demarez et al. |
| 2003/0185161 A1 | 10/2003 | Harris et al. |

FOREIGN PATENT DOCUMENTS

DE   197 07 261   4/1998
(Continued)

OTHER PUBLICATIONS

Digital Cellular Telecommunications System (Phase 2+). Universal Mobile System (UMTS). General Packet Data System (GPRS). Service Description: stage 2, 3 GPP TS 23.060. V6. 12:0 Rel.g, ETSI TS 123 0+0 V6, 12.0; chapter 8.1.4 Paging for GPRS Downlink Transfer, Mar. 2006.

(Continued)

*Primary Examiner* — Barry Taylor
(74) *Attorney, Agent, or Firm* — Faegre Baker Daniels LLP

(57) ABSTRACT

The invention relates to a method for reduction of the incoming delay time in network-initiated data transmission in GPRS-mobile communication networks, wherein data transmission is initiated to a mobile communication terminal device in a ready state via a requesting network node, wherein the first data packet to be sent by the requesting network node has already been transmitted to the base station subsystem together with a Paging Request message.

20 Claims, 2 Drawing Sheets

FOREIGN PATENT DOCUMENTS

| | | |
|---|---|---|
| DE | 697 32 100 | 12/2005 |
| DE | 601 10 737 | 2/2006 |
| EP | 0 642 283 | 3/1995 |
| EP | 1 107 626 | 6/2001 |
| EP | 1 182 894 | 5/2004 |
| EP | 1 042 938 | 11/2005 |
| EP | 0 953 270 | 6/2006 |
| WO | 99/52306 | 10/1999 |

OTHER PUBLICATIONS

ETSI TS 123 060, Global System for Mobile Communications, Digital cellular telecommunications system (Phase 2+); Universal Mobile Telecommunications System (UMTS); General Packet Radio Service (GPRS); Service description; Stage 2 (3 GPP TS 23.060 Version 6.23.0, Release 6), Mar. 2006.

* cited by examiner

Mobility States in the
Mobile Communication
Terminal Device

Mobility States
in the Network Node
SGSN

METHOD FOR REDUCING THE DELAY TIME BY A PAGING PROCEDURE IN NETWORK-INITIATED DATA TRANSMISSION IN GPRS-MOBILE COMMUNICATION NETWORKS

CROSS-REFERENCE TO RELATED APPLICATION

This application is related to and claims the benefit under 35 U.S.C. §119 and 35 U.S.C. §365 of International Application No. PCT/EP2007/003895, filed May 3, 2007.

The invention relates to a method for reduction of the incoming delay time in network-initiated data transmissions in GPRS-mobile communications networks, in particular in packet-switched mobile communications networks.

A terminal device in packet-switched mobile communications networks (GPRS, UMTS and others) can be in different mobility states. The mobility states can be generalized in active states in which the whereabouts of the terminal device in the network are known and inactive or standby states, in which case the precise whereabouts of the terminal device in the network are unknown. If a terminal device is in active states data can be exchanged between network and terminal device without prior procedures. In these mobility states transmission resources are allocated between network and terminal device. In inactive or standby states no transmission resources are allocated, so that procedures are to be executed prior to a data transmission between network and terminal device, said procedures which update the whereabouts of the terminal device on the network and subsequently allocate transmission resources. On the basis of the procedures for updating of the whereabouts and for allocation of transmission resources there is an incoming delay until data can be transmitted.

The present invention is therefore based on the object of reducing the incoming delay until data in the downlink are transmitted for terminal devices in inactive or standby states.

This problem is solved in accordance with the invention by a method in accordance with independent Claim 1, to whose features reference is made here.

Preferred embodiments and advantageous features of the invention arise from the dependent claims, to whose features reference is made here.

A method for reduction of the incoming delay time in network-initiated data transmission in mobile communications networks is proposed, wherein a data transmission is initiated by a requesting network node to a mobile communications terminal device in a ready state or idle state. In accordance with the invention the first data packet to be sent by the requesting network node has already been transmitted to the base station subsystem together with a Paging Request message.

In a preferred embodiment of the invention provision is made that the base station subsystem immediately sends the first data packet to the mobile communications terminal device as soon as the mobile communications terminal device has reported to the base station subsystem as a response to the Paging Request message.

In a further embodiment of the invention the acknowledgment of the mobile communications terminal device is relayed by the base station subsystem to the requesting network node so that subsequent data packets can be transmitted to the correct whereabouts of the mobile communications terminal device.

The inventive method can be implemented as a computer program which is executed in a base station subsystem. An arrangement for the carrying out of the method can comprise at least one processing unit (CPU) and a memory.

The subsequent description refers to GPRS mobile communications networks; however the proposal for improvement is transferable to other mobile communications networks such as UMTS, CDMA and others.

Figure 1:
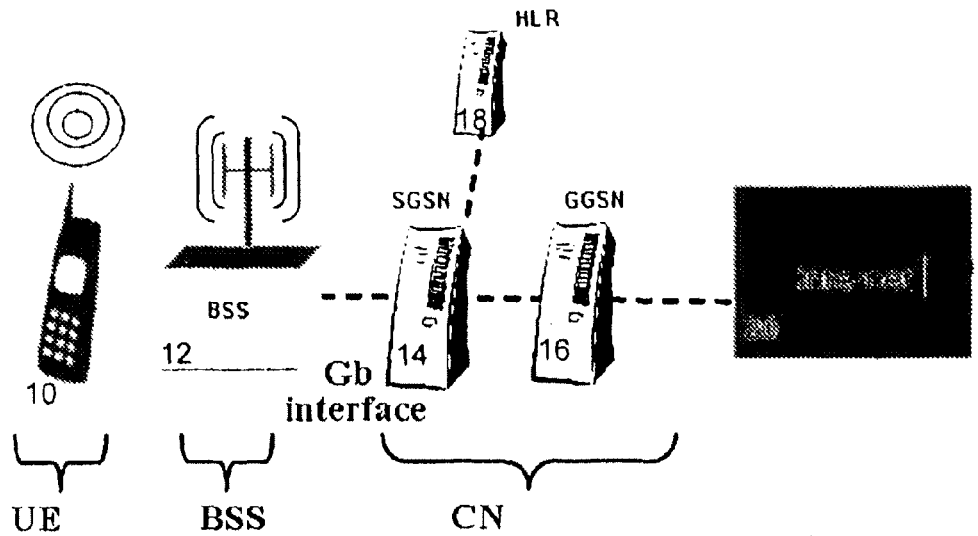
FIG. 1 shows a simplified GPRS network architecture

In FIG. 1 a simplified network architecture of a GPRS mobile communications network is shown. A mobile communications terminal device 10 (UE) can communicate via an air interface with a base station subsystem 12 (BSS) of a (GPRS) mobile communications network. The base station subsystem comprises send-receive devices and base station control devices and is connected via network nodes, SGSN: Serving GPRS Support Node 14, and GGSN: Gateway GPRS Support Node 16 to other network nodes, e.g. the home location register HLR 18, communications devices, and other networks, for example the Internet 20.

Figure 2:
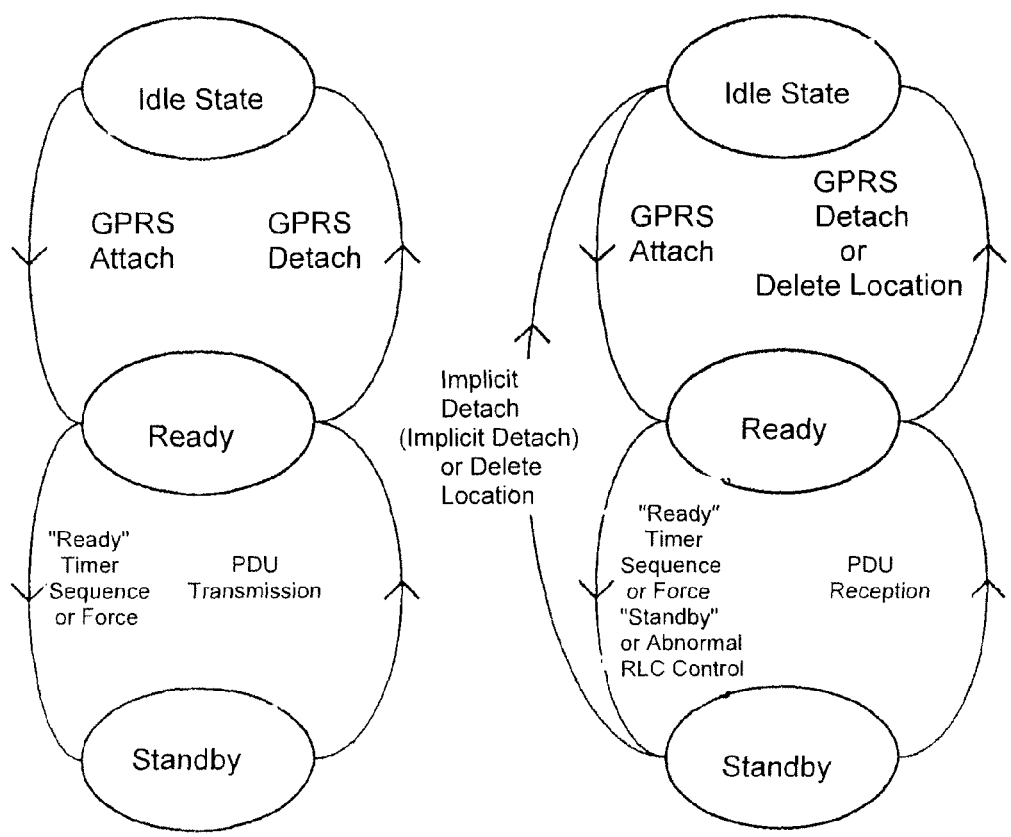
FIG. 2 shows possible GPRS mobility states of a mobile communications end device (in accordance with 3 GPP 03.60).

In FIG. 2 possible GPRS mobility states of a mobile communications device are shown (3GPP 03.60). In the ready state the whereabouts (radio cell) of the terminal device in the SGSN are known and consequently the SGSN can send incoming data in the Downlink (that is from the network to the terminal device) directly to the corresponding terminal device. In the standby state and idle state of the terminal device this is not the case. If an terminal device is in standby state the SGSN cannot send incoming data in the downlink directly to the terminal device, but rather must first determine the whereabouts (send station in whose service area the terminal device is currently staying) of the terminal device. This is achieved via a so-called Paging procedure. During the Paging procedure the mobile communications network in a routing area (See Specification 3GPP 43.064) sends the identification of the terminal device. If the terminal device recognizes its own identification the terminal device answers with a corresponding message and the whereabouts of the terminal device are subsequently known in the SGSN. After that it is possible for the SGSN to send data to the terminal device.

Figure 3:
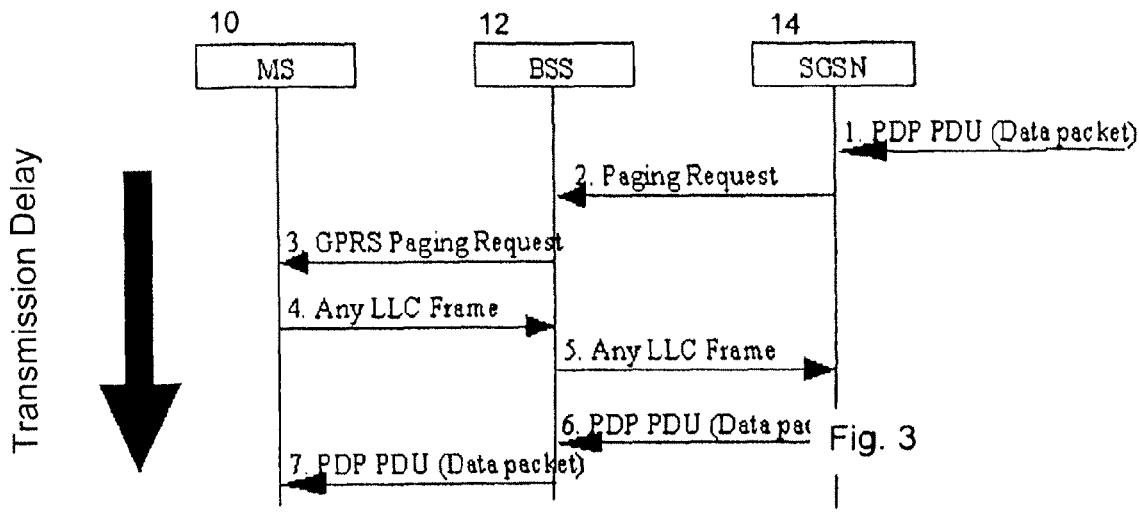
FIG. 3 shows the signaling sequence in the case of a GPRS Paging procedure

GPRS Paging procedure is shown in FIG. 3:
A first data packet (PDP PDU) to be sent to the mobile communications device (MS) 10 arrives at the responsible SGSN 14 (Step 1). The whereabouts of the mobile communications device 10 are not (precisely) known to the network, since it is for example in ready state or idle state. The SGSN 14 relays a so-called Paging Request message to the BSS 12 (Step 2). The 12 BSS sends the Paging Request message which is received by the mobile communications device 10 (Step 3). The mobile communications device 10 answers with a message (Any LLC Frame) to the BSS (Step 4). This message is forwarded by the BSS 12 to the SGSN 14, which can deduce from this the location of the mobile communications terminal device 10 (Step 5). Now the SGSN 14 can relay the first data packet (PDP PDU) to the BSS 12 (Step 6), which forwards the data packet (PDP PDU) to the mobile communications terminal device 10 (Step 7). On the basis of the GPRS Paging procedure an initial delay time (Transfer Delay) arises in the transmission of a data packet (PDP PDU) in the downlink direction. This delay time can be reduced by an optimization of the Paging procedure. The objective of the inventive method is to conserve the time which in particular is generated by Steps 5 and 6 of the Paging procedure (see FIG. 3).

Figure 4:
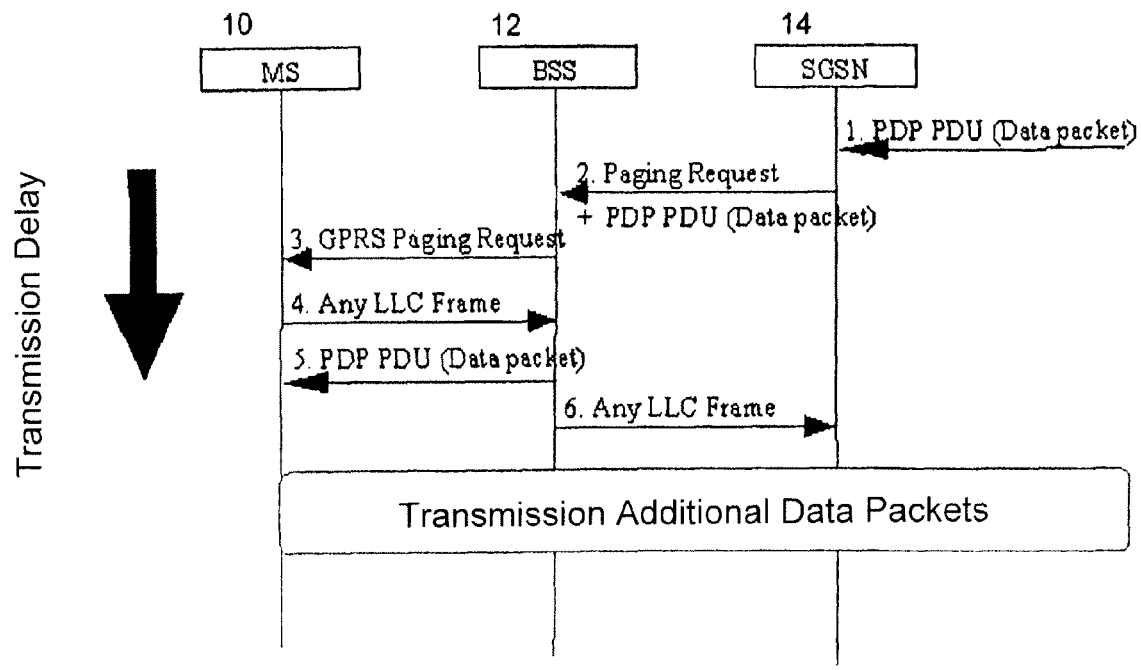
FIG. 4 shows the signaling sequence in the case of an optimized GPRS Paging procedure in accordance with the invention.

In FIG. 4 the optimized Paging procedure is shown. In accordance with the invention the first data packet (PDP PDU) to be sent by the SGSN 14 is sent together with the Paging Request message to the BSS 12 (Step 2). Thus at a time at which the whereabouts of the mobile communications terminal device 10 are not yet known. If in this case the mobile communications terminal device 10 reports as an answer to the Paging procedure in the BSS 12 (Steps 3 and 4), the BSS 12 can thus immediately send the first data packet (PDP PDU) to the mobile communications terminal device (Step 5). Step 7 (relaying "Any LLC Frame" message from BSS to SGSN) in the Paging procedure however continues to be necessary in order to transmit subsequent data packets to the correct whereabouts.

Through the described optimization of the GPRS Paging procedure for one thing the transfer time of the messages "Any LLC frame" and of the first data packet (PDP PDU) on the BSS-SGSN interface is conserved. For another thing the processing time of the SGSN of these two messages is conserved.

A further advantage of the optimized Paging procedure consists in the fact that the BSS 12 receives the first data packet to be transmitted (PDP PDU) prior to the allocation of transmission resources. As a result the BSS 12 has an indication of the data quantity to be transmitted and can already take this indication into consideration in the case of the first allocation of transmission resources. In the case of large data packets the BSS 12 allocated more transmission resources than in the case of small data packets. Without the optimized Paging procedure the first allocation of transmission resources can only be an estimate and cannot be optimal, since the size of the data volume is unknown. Hence a subsequent change of the transmission resources is necessary in the case of low allocated transmission resources. This leads to delays in the transmission time. In the case that the allocated resources cannot be fully utilized by the data quantity a usage of the transmission resources takes place.

10 Mobile communications terminal device
12 Base station subsystem
14 SGSN
16 GGSN
18 HLR
20 Internet

The invention claimed is:

1. A method for network initiated data transmissions in mobile communications networks, wherein a data transmission is initiated to a mobile communications terminal device in a ready state via a requesting network node, wherein a Paging Request message, Paging Request, is transmitted to a base-station subsystem, wherein for reduction of the incoming delay time of the network node a first data packet to be transmitted by the requesting network node is already transmitted to the base station subsystem together with a Paging Request message (Paging Request), wherein the base-station subsystem receives the first data packet to be transmitted (PDP PDU) prior to an allocation of transmission resources on the communications interface, as a result of which the base-station subsystem has an indication of the data quantity to be transmitted and can take this indication into consideration in the case of the first allocation of transmission resources.

2. The method according to claim 1, wherein the base station subsystem immediately sends the first data packet to the mobile communications terminal device as soon as the mobile communications terminal device has reported to the base station subsystem as a response to the Paging Request message.

3. The method according to claim 2, wherein the acknowledgment of the mobile communications terminal device is relayed by the base station subsystem to the requesting network node so that subsequent data packets can be transmitted to the correct whereabouts of the mobile communications terminal device.

4. The method according to claim 2, wherein the base substation subsystem allocated more transmission resources in the case of a large data quantity than in the case of a small data quantity.

5. A computer program which is executed in a requesting network node or in a base-station subsystem for the carrying out of the steps of the method in accordance with claim 2.

6. An arrangement which consists of at least one processing unit (CPU) and one memory, wherein the arrangement exhibits means for the carrying out of the steps of the method in accordance with claim 2.

7. The method according to claim 1, wherein the acknowledgment of the mobile communications terminal device is relayed by the base station subsystem to the requesting network node so that subsequent data packets can be transmitted to the correct whereabouts of the mobile communications terminal device.

8. The method according to claim 7, wherein the base substation subsystem allocated more transmission resources in the case of a large data quantity than in the case of a small data quantity.

9. A computer program which is executed in a requesting network node or in a base-station subsystem for the carrying out of the steps of the method in accordance claim 7.

10. An arrangement which consists of at least one processing unit (CPU) and one memory, wherein the arrangement exhibits means for the carrying out of the steps of the method in accordance with claim 7.

11. The method according to claim 1, wherein the base substation subsystem allocates more transmission resources in the case of a large data quantity than in the case of a small data quantity.

12. A computer program which is executed in a requesting network node or in a base-station subsystem for the carrying out of the steps of the method in accordance claim 11.

13. An arrangement which consists of at least one processing unit (CPU) and one memory, wherein the arrangement exhibits means for the carrying out of the steps of the method in accordance with claim 11.

14. A computer program which is executed in a requesting network node or in a base-station subsystem for the carrying out of the steps of the method in accordance with claim 1.

15. An arrangement which consists of at least one processing unit (CPU) and one memory, wherein the arrangement includes means for carrying out of the steps of the method in accordance with claim 1.

16. A method for network initiated data transmissions in mobile communications networks, wherein a data transmission is initiated to a mobile communications terminal device in a ready state via a requesting network node, wherein a Paging Request message, Paging Request, is transmitted to a base-station subsystem, wherein for reduction of the incoming delay time of the network node a first data packet to be transmitted by the requesting network node is already transmitted to the base station subsystem together with a Paging Request message (Paging Request), wherein the base-station subsystem receives the first data packet to be transmitted (PDP PDU) prior to an allocation of transmission resources on the communications interface, as a result of which the base-station subsystem has an indication of the data quantity to be transmitted and can take this indication into consideration in the case of the first allocation of transmission resources, and wherein the Paging Request is sent by the base-station subsystem to the mobile communications terminal device without the first data packet attached to the Paging Request.

17. The method according to claim 16, wherein the base station subsystem immediately sends the first data packet to the mobile communications terminal device as soon as the mobile communications terminal device has reported to the base station subsystem as a response to the Paging Request message.

18. The method according to claim 16, wherein the base substation subsystem allocates more transmission resources in the case of a large data quantity than in the case of a small data quantity.

19. A computer program which is executed in a requesting network node or in a base-station subsystem for the carrying out of the steps of the method in accordance with claim 16.

20. An arrangement which consists of at least one processing unit (CPU) and one memory, wherein the arrangement includes means for carrying out of the steps of the method in accordance with claim 16.

* * * * *